I. EASTWOOD.

Plow Fender.

No. 106,344.

Patented Aug. 16, 1870.

WITNESSES:
John F. Fennell
A. W. Myggatt

INVENTOR:
Isaac Eastwood
By his Attorney N. Crawford

UNITED STATES PATENT OFFICE.

ISAAC EASTWOOD, OF LANARK, ILLINOIS.

IMPROVEMENT IN PLOWS.

Specification forming part of Letters Patent No. 106,344, dated August 16, 1870.

*To all whom it may concern:*

Be it known that I, ISAAC EASTWOOD, of Lanark, in the county of Carroll, in the State of Illinois, have invented certain Improvements in Plows, of which the following is a specification.

Many attempts have been made to construct and attach devices to plows that will cause all the stubble, weeds, and corn-stalks to be placed in the furrow and be completely covered by the furrow-slice turned by the same plow, and these attempts have but partially succeeded.

The object of this invention is to attach to a common stubble-plow devices by which the weeds, stubble, and corn-stalks shall be so placed in the furrow and covered by the furrow-slice that is cut by the plow at the same time that the device attached to the plow gathers such stubble and weeds and holds them in such position that the furrow-slice forces the stubble into the furrow, and when there covers them by falling upon and over them; and it consists in the construction of the device and its attachment to the plow, whereby the result is effected.

Figure 1:
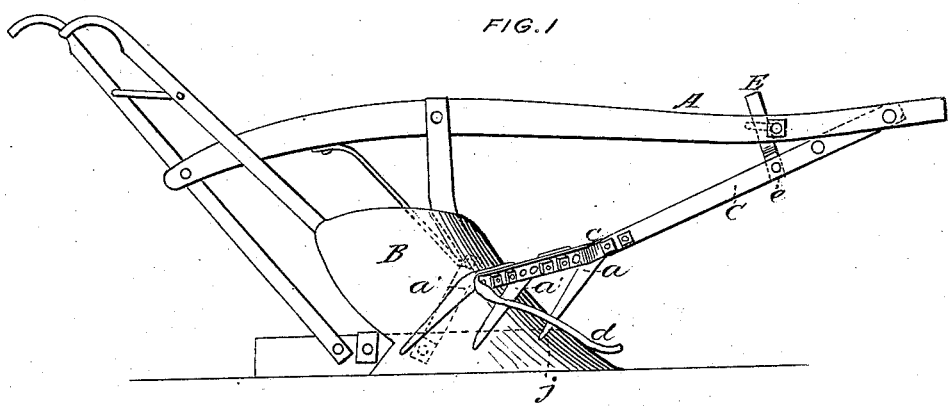
Figure 2:
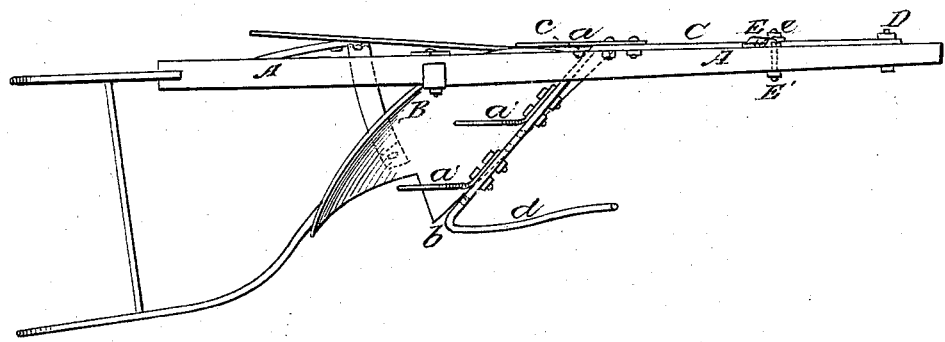

In the drawings, Figure 1 is a side elevation of a plow with my invention attached, and Fig. 2 is a top view of the same.

A is a beam of a common plow, and B is the mold-board. C is a bar, of iron, attached at its forward end to the plow-beam A by the screw-bolt D, and extends back at an angle with the beam of a plow to a point nearly perpendicular over the plow-point, where, at *c*, it is bent to be on a line with and over the outer edge of the share, and over the heel of which, at *b*, it suddenly bends forward and downward, terminating in arm *d*, which, from the angle at *b*, is made round and smooth, and having its forward end turned upward somewhat in the form of a runner, so that it will pass over the ground without being caught, and thereby thrown out of position. This bar C is supported at a suitable distance from its forward end and made adjustable to different heights by arm E, being pivoted at *e* by a bolt or other device, and the arm clamped to the plow-beam by the screw clamp-bolt and nut E'. By this arrangement the whole device is adjusted to any desired height as the plow is made to go deeper or shallower in the ground, and so as to be most effectual in its work. Upon this bar are three or more cutters, *a a'* *a'*, that incline downward and extend back toward the breast and mold-board of the plow. The first of these cutters, *a*, is placed upon and attached to the bar C just above the angle at *c*, and answers as a common colter for cutting the furrow-slice from the land, and by its inclining downward and back makes a drawing or shear cut, causing all stubble, weeds, or corn-stalks that may be at an angle with the direction that the plow is going to be cut in two and be free to be turned under by the mold-board of the plow into the furrow.

The cutters *a' a'*, that are placed upon that part of the bar C forward of the mold-board, and between the angle at *c* and the bend at *b*, are adjustable upon the bar, and there may be two or more, as the nature of the work to be done may require. They also incline backward and downward the same as the one that acts as a colter, which insures the cutting of all the stubble and weeds that may lie at an angle with the furrow-slice. The stubble, weeds, or other stuff lying upon the furrow-slice as the plow advances will be raised on the mold-board and come in contact with that part of the bar C that is forward of the mold-board, and by its inclination to the line of direction in which the plow is drawn forces such weeds, stubble, and stalks into the angle, at *b*, of bar C, when the furrow-slice in turning over falls upon and carries such weeds and stubble to the bottom of the furrow, where they are completely covered by the furrow-slice as the mold-board turns it over and upon them.

The forward and downward projecting arm *d* is of importance, as it gathers and holds all the stuff that is forced into the angle at *b* until drawn into the bottom of the furrow by the falling of the furrow-slice.

I am aware that devices have been attached to plows for the purpose of forcing into the furrow to be covered such stuff as stubble, weeds, and corn-stalks, but so far as I know all such attempts have only partially succeeded; but by my construction, which is entirely different from all others, most satisfactory results have been obtained, as all the stubble and even large corn-stalks are completely covered by reason of the cutting them into short pieces and gathering them into such shape and place as that the falling furrow-slice will surely cover them.

Having thus described my invention, what

I claim, and desire to secure by Letters Patent, is—

1. The bent bar C, having cutters $a\ a'\ a'$ attached thereto, and terminating in arm $d$, when attached to and made adjustable upon the beam A of a plow, in the manner and for the purpose described.

2. The adjustable and detachable cutters $a'\ a'$ and bar C, when arranged with relation to each other and operating in the manner and for the purpose described.

ISAAC EASTWOOD.

Witnesses:
 EDM. F. BROWN,
 JNO. F. FENNELL.